United States Patent
Chang et al.

(10) Patent No.: US 6,848,004 B1
(45) Date of Patent: Jan. 25, 2005

(54) SYSTEM AND METHOD FOR ADAPTIVE DELIVERY OF RICH MEDIA CONTENT TO A USER IN A NETWORK BASED ON REAL TIME BANDWIDTH MEASUREMENT & PREDICTION ACCORDING TO AVAILABLE USER BANDWIDTH

(75) Inventors: Sih-Pin Subrina Chang, Old Tappan, NJ (US); Shu-Chen Jeane Chen, Chappaqua, NY (US); Keeranoor G. Kumar, Randolph, NJ (US); James S. Lipscomb, Yorktown Heights, NY (US); Jai Menon, Croton-on-Hudson, NY (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,585

(22) Filed: Nov. 23, 1999

(51) Int. Cl.$^7$ .............................................. G06F 15/16
(52) U.S. Cl. ...................... 709/232; 709/224; 709/231; 370/232
(58) Field of Search ................................ 709/231, 226, 709/225, 224, 228, 219, 223, 230, 232, 233, 234, 235; 370/229, 230, 231, 477, 431, 232, 233, 234; 719/315, 316, 332

(56) References Cited

U.S. PATENT DOCUMENTS 5,548,761 A * 8/1996 Balasundaram et al. .... 717/159
5,737,619 A    4/1998 Judson
5,841,978 A   11/1998 Rhoads
5,884,037 A * 3/1999 Aras et al. ................... 709/226
5,918,012 A    6/1999 Astiz et al.
6,272,539 B1 * 8/2001 Cuomo et al. ............... 709/223
6,292,834 B1 * 9/2001 Ravi et al. ................... 709/233
6,363,056 B1 * 3/2002 Beigi et al. ................. 370/252
6,377,989 B1 * 4/2002 Fukasawa et al. ........... 709/224
2003/0101263 A1 * 5/2003 Bouillet et al. ............. 709/225

* cited by examiner

Primary Examiner—William C. Vaughn, Jr.
(74) Attorney, Agent, or Firm—David M. Shofi

(57) ABSTRACT

A network implementing HotMedia architecture provides real time measurement and prediction of bandwidth for adaptive content delivery of rich media according to available user bandwidth. The rich media file created at the creation station is transmitted by the delivery station to the client station in steaming Java applets having a framework including a thumbnail frame and a media frame. In real-time, the client station detects the bandwidth used by the Java applet; predicts the available bandwidth for next media delivery based on the detected bandwidth and fetches the corresponding sensitive bandwidth media fame from a web server according to a linear or non-linear prediction algorithm resulting in bandwidth sensitive rich media content delivery from the delivery station to the client station for display and user interaction.

17 Claims, 3 Drawing Sheets

SYSTEM AND METHOD FOR ADAPTIVE DELIVERY OF RICH MEDIA CONTENT TO A USER IN A NETWORK BASED ON REAL TIME BANDWIDTH MEASUREMENT & PREDICTION ACCORDING TO AVAILABLE USER BANDWIDTH

RELATED APPLICATIONS

1. U.S. Pat. No. 6,356,921, issued Mar. 21, 2002, entitled "Framework for Progressive Hierarchical and Adaptive Delivery Rich Media Presentations and Associated Meta Data" (SE9-98-030V).

2. U.S. Pat. No. 6,448,980, issued Sep. 10, 2002, entitled "Personalizing Rich Media Presentations Based On User Response to the Presentation" (SE9-98-028V).

3. U.S. Ser. No. 09/100,419, filed Jun. 20, 1998, entitled "Progressive Interleaved Delivery of Interactive Descriptions and Renderers for Electronic Publishing of Merchandise" (SE9-98-004).

4. U.S. Ser. No. 10/392,055, filed Mar. 19, 2003, entitled "System and Method for Tracking User Interactions and Navigation During Rich Media Presentations" (SE999-006/1963-7334US1).

5. U.S. Ser. No. 09/438,493, filed Nov. 12, 1999, entitled "A System and Method of Enriching Non-Linkable Media Representations In A Network By Enabling An Overlying Hotlink Canvas" (SE9-99-012/1963-7341).

All of the above applications have been assigned to the Assignee of the present invention and are fully incorporated herein by reference.

BACKGROUND OF INVENTION

1. Field of Invention

This invention relates to multimedia network, systems and methods of operation. More particularly, the invention relates to systems and methods for adaptive delivery of rich media content to a user in a network based on real time bandwidth measurement and prediction, according to available user bandwidth.

2. Description of Prior Art

In recent years, there has been a sizeable growth in the use of rich media over the World Wide Web as more and more individuals and institutions are beginning to realize the web's potential in a broad range of applications including electronic commerce, education training, news, etc. Examples of rich media include animation, audio, 3-D, panoramas, and videos. There are two apparent clusters of rich media technology. One at the low end and the other at the high end, which hampers effective deployment of some rich media in Internet based applications. The "low end" cluster comprises static images and simple non-interactive animations (typically animated GIFs) which are easy to deploy and therefore have widespread usage. The "high end" clusters comprises richer and more natural experiences with larger interactivities, such as panoramas, 3-D, streaming audio/video, and composite media (e.g., MPEG-4), but the difficulty of deployment has limited widespread usage. A novel scaleable architecture called HotMedia bridges the gap between the two clusters thereby achieving widespread web penetration. A key feature of the technology is a suitable delivery file format that can contain heterogeneous compositions of media bit streams as well as meta data that defines behavior, composition and interaction semantics. The delivery file format enables the creation of lightweight single file representation of interactive, multistage presentations resulting in multiple media type contents. At the core of HotMedia client is a smart content algorithm that infers media types from the incoming data stream and fetches the media renderer components, user-interface components and hyper-linked action components, all just in time, resulting in progressive and context driven enrichment of the user experience. Further details related to HotMedia architecture are decribed in U.S. Pat. No. 6,611,812 entitled "Framework For Progressive Hierarchical and Adaptive Delivery Rich Media Presentation and Associated Meta Data", issued Aug. 26, 2003 (SE9-98-033), supra.

Often instances of rich media incorporate links to other presentations to expand a user experience. The process of clicking on a link in a media for transfer to the other presentation is referred to as "hot linking" or "hyper linking" which is further described in U.S. Pat. No. 5,841,978 entitled "Networking Using Steganographically Embedded Data Objects" issued Nov. 24, 1998 and U.S. Pat. No. 5,918,012 entitled "Hyper Linking Time Based Data" issued Jan. 29, 1999. The real power of "HotMedia" is in how the experience is delivered to the user. A dynamic content delivery system to a user should take into account the user's connection speed to enhance the user experience. For example, when a user has experienced reduced bandwidth because of having heavy CPU usage, phone line noise or other web browser instances, the user could receive seamlessly adjusted web content corresponding to the reduced bandwidth. LAN users might get higher quality video clips or audio clips than T1 users, with 56K modem connection user's surfing higher quality images than 28.8K modem users. An adaptive content delivery system according to user connection speed or bandwidth should have the following design goals:

1. An adaptive content delivery framework that expands the scope of information that can be adaptively delivered.

2. A content creation phase that enables individual specification and customizability of information to be adapted to the delivery for every bandwidth sensitive content context.

3. Adaptive content delivery servers requiring neither change to the server code nor changes to content for seamless interfacing.

4. A cascading delivery structure for efficient content delivery as used in the HotMedia architecture.

5. A content delivery system which provides for adaptive delivery disablement for the content.

Prior art related to multimedia delivery systems include the following:

U.S. Pat. No. 5,737,619 entitled "World-Wide Web Browsing with Content Delivery Over An Idle Connection & Interstitial Content Display" by D. H. Judson, discloses a personal computer supporting a graphical user interface and an Internet browser. The computer locally stores retrieves and outputs information objects to reduce waiting time normally associated with downloaded hypertext documents having high resolution graphics. In one embodiment, a web page is displayed on the graphical user interface and has at least one link to a hypertext document, preferably located at a remote server. When the user clicks on the link, the link is activated by the browser to request downloading of the hypertext documents from the remote server to the graphical user interface. While the user waits for a reply and/or as the hypertext document is being downloaded, the browser displays a previously cached information object.

An Internet program "Speed Select" from Match Logic of Excite (http://www.matchlogic.com) makes use of a user's historical profile saved over time to predict a user's connection speed at any time, based on measurements taken at similar times of the day.

None of the prior art discloses a generalized adaptive rich media content delivery framework based on real time bandwidth measurements, prediction and dynamic content delivery at the user so that advertisers or content providers can ensure that all times users receive bandwidth-sensitive content.

SUMMARY OF THE INVENTION

An object of the invention is a multimedia network adaptively delivering rich media to a client station according to available user bandwidth in the network.

Another object is an adaptive delivery system for rich media content to a client station in a multimedia network based on bandwidth measurement and prediction according to available user bandwidth.

Another object is an adaptive delivery system for rich media content in a network which enables a content creator to specify presentation events or user interactions that trigger adaptive content delivery during presentation of rich media content to a client station.

Another object is an adaptive delivery system for rich media content to a client station in a network that takes advantage of dynamic Java class loading mechanism and progressive rich media delivery mechanism to perform real time bandwidth measurement and prediction in the network.

Another object is an adaptive delivery system and method of operation for rich media content to a client station in a network which provides seamless interfacing with multiple adaptive content delivery servers requiring neither changes to server code nor changes to content.

These and other objects, features and advantages are achieved in a network implementing HotMedia architecture including a content creation station and a content delivery station coupled to a client station via the network for delivery of rich media to the client station for display and interaction with a user. The rich media file created at the creation station is transmitted by the delivery station to the client station in streaming Java applets having a framework including a header frame, a thumbnail frame, a media frame, a meta frame, and an end-of-stream frame. The content creation station enables a creator to specify presentation events or user interactions that trigger an adaptive content delivery during presentation of the rich media content. The client station takes advantage of the dynamic Java class loading mechanism and progressive rich media mechanism to do real time bandwidth measurement and prediction. The delivery station monitors available user bandwidth derived from the client station and calibrates a rich media delivery, fine-tuned to each user capability. In real-time, the client station detects the bandwidth used by the Java applet; predicts the bandwidth for next media delivery based on the detected bandwidth and fetches the corresponding sensitive bandwidth media frame from a web server according to an algorithm resulting in bandwidth sensitive rich media content delivery from the delivery station to the client station for display and user interaction.

DESCRIPTION OF DRAWING

The invention will be further understood from the following detailed description of a preferred embodiment taken in conjunction with an appended drawing, in which.

DESCRIPTION OF PREFERRED EMBODIMENT

Figure 1:
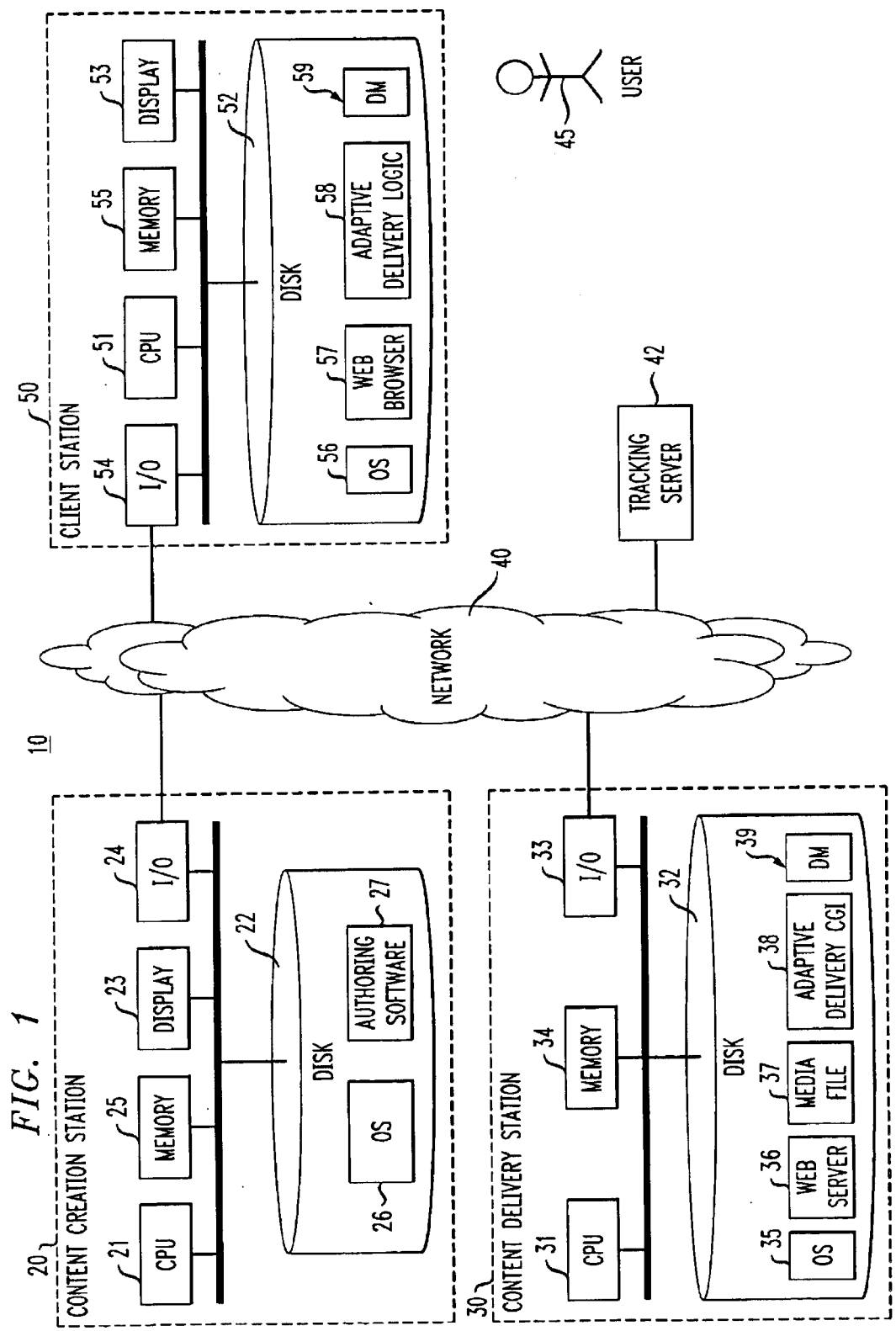
FIG. 1 is a system diagram of a content creator station, content delivery station, client station for user interaction, coupled to a network implementing HotMedia architecture and incorporating the principles of the present invention.

In FIG. 1, a system 10 for real time bandwidth measurement and prediction according to a user's available bandwidth includes a content creation station 20 and a content delivery station 30 coupled to a network 40, typically a distributed information system, e.g., the Internet capable of handling rich media. The network further includes a client station 50 which enables a user 45 to interact with the rich media to provide inputs to the client station for real time bandwidth measurement and prediction. The delivery station 30 delivers appropriate rich media content to the client station 50. A tracking server 42 is coupled to the network 40 for tracking the user interactions with rich media file received by the client station.

The content creation station 20 includes a standard CPU 21 coupled to a hard disk 22; a display 23, an input/output terminal 24 and a standard random access memory 25. Contained in the disk 22 are software for station operation 26, e.g. Windows 95 and an authoring tool for a creator (not shown) to create rich media in a HotMedia file format supported by the HotMedia Architecture as will be described in conjunction with FIG. 2. Authoring tools are well known in the art as evidenced by U.S. Pat. No. 5,801,687 entitled "Authoring Tool Comprising Nested State Machines For Use In A Computer System", issued Sep. 1, 1998. Content creation tables enable a creator to specify presentation events or user interaction to trigger an adaptive content delivery during presentation of rich media contact. For example, when the creator is creating a hot link to different rich media file from within one, the creator will be presented a check box to indicate whether the execution of the link should be adaptively delivered adapting to the predicted available bandwidth and specify the detailed mapping information. Accordingly in the offering phase, the content creator can choose which delivery is preferred. In general, the content creator can create different versions of rich media content corresponding to different network connections. The different versions can be done via multiple files or one single file. All dynamic content delivery options are saved in a HotMedia file.

The content delivery station 30 similarly contains a standard CPU 31 coupled to a hard disk 32, an input/output terminal 33, and a standard random access memory 34. Contained in the disk 32 are a station operating system 35, e.g. Windows NT, web server software 36 for delivering over the network 40, a HotMedia file(s) 37 created by the authoring tool through Java applets. An adaptive delivery CGI (Common Gateway Interface) file 38 including a delivery logic (not shown) and decision maker software 39 for delivering bandwidth-sensitive media content from the web server 36.

The client station includes a standard CPU 51 coupled to a hard disk 52; a display 53, an input/output terminal 54, and a standard random access memory 55. Further details on the client station are described in U.S. Ser. No. 10/392,055, filed Jun. 20, 1998, entitled "Progressive Interleaved Delivery of Interactive Descriptions and Renderers for Electronic Publishing of Merchandise" (SE9-98-004), supra. Contained in the disk 52 are software for station operation 56, e.g. Windows 95, a web browser 57; software 58 for content presentation including Hot Media kernel code and decision maker software 59 for choosing bandwidth-sensitive media content from the web server 36.

The client station takes full advantage of dynamic Java class loading mechanism and progressive rich media delivery to perform real time bandwidth measurement and prediction. The client station monitors available user bandwidth and calibrates itself to provide a web browsing experience fine-tuned to each user's capability.

Having described the network and system of the present invention, a description of the HotMedia file format is believed appropriate for delivery of a rich media presentation to a user(s) in which the file format contributes to the real time measurement and prediction of bandwidth of the rich media presentation according to available user bandwidth.

Figure 2:
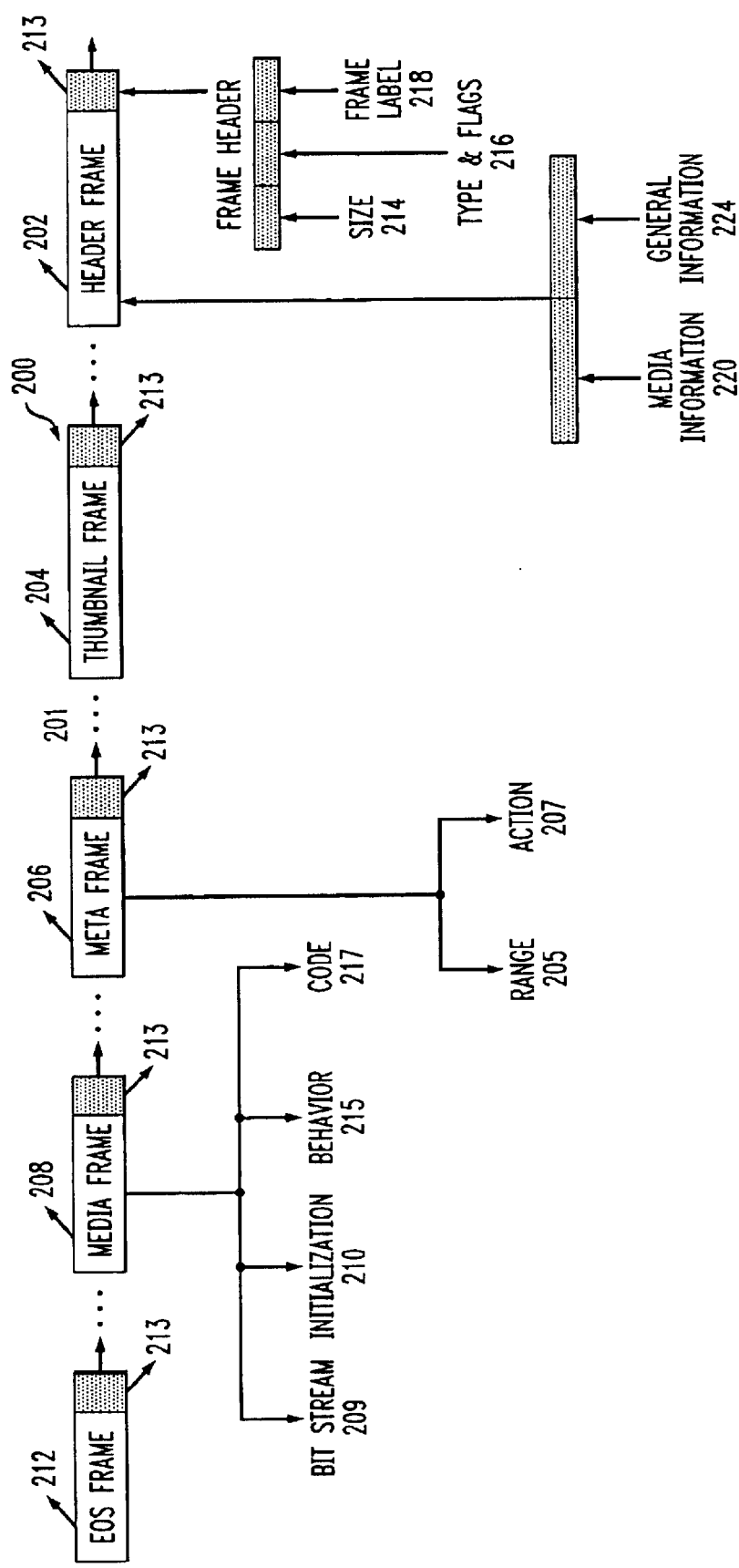
FIG. 2 is a representation of a HotMedia file format comprising a sequence of frames for transmitting rich media in the system of FIG. 1.

FIG. 2 shows a HotMedia presentation file 200 in a framework 201 which is essentially a sequence of frames types comprising header 202, thumbnail 204, meta 206, media 208, and an end of stream 212. The first frame is the header frame 202. The header frame is actually followed by the thumbnail frame 204. After these frames a sequence of other frames occurs and in no pre-mandated order or number. The header frame 202 is the only one whose presence is mandatory in the format. The most degenerate yet useful version would have a header frame followed by a thumbnail frame 204. Media frames 208 appear in all other instances. Meta frames 206 are present only in cases where non-default behavior and configuration are desired on cases where hyper linked action semantics are to be incorporated. The information for adaptive delivery option is stored in Meta frames 206. All frames have a similar 12 bit initial section 213 that enables a uniform procedure for their identification to a type and frame label as well as the determination of their size. The HotMedia file format is created to have minimum overhead and maximum modularity. The format makes it suitable for optimal delivery of a low bandwidth as well as for rich experiences over high bandwidth.

The header frame 202 includes a frame header 213 which provides information about frame size 214, types and flags 216 and frame labels 218. The header frame 202 also includes media information 220 containing definition on different media tracks that may be contained in the file. General information 224 in the header frame 202 provides the class name of the code that renders the media type on the client station. When HotMedia kernel code in the content presntation software in CPU 51 parses the media track information on the file header and if it encounters the specification of a class name, the media type field is ignored and the code specified by the class name is sent from the delivery server 30 in order to render the data of the track in question. The class name permits the introduction of whole new media types into the presentation. No changes or additions to the client kernel code are needed so long as the media objects implements the interfaces specified in the HotMedia framework 201 for first class members of a media object set.

The thumbnail frames 204 carry a minimalistic representation of the information shared by the HotMedia file framework 201. For example, if the information carried in the file were a description of merchandise, the thumbnail would carry a single image. Thumbnail frames make possible providing the user a quick introduction to the subject with minimal code and data transfer. Since users pay attention to detail only when the subject is of some interest, it would be wasteful for such data and codes to enable anything beyond the initial experience unless an interest is indicated. In addition to a frame header, the thumbnail frames also carry parameters for producing image pan and animation effects on the single image (all not shown).

Meta frames 206 carry specification of non-media specific information pertaining to enablement of hyper linked actions from media context, tracking of interaction and adaptive delivery of rich media content. Action semantics associated with media segments can be expressed in HotMedia files 200 using range 205 and action subtypes 207. Range frames 205 are made up of range records that identify and label spatio-temporal segments of media. A spatial range can be described by a rectangular or elliptical contour. Temporal ranges can refer to a time range in milliseconds for a real time media-like audio or a count range for non-real-time media like animation. The range specification can also express a combination of space and time.

Action records 207 may be pre-programmed into the HotMedia file 200 for the execution of many types of action in the context of a presentation. Action frames can carry multiple action records all pertaining to a single actionable context, namely the presentation of media segment as specified by a range. Action records are the specification mechanism for all types of actions that can be triggered during the context of presenting a certain media segment while in a certain state of the media object. Actions can belong to a variety of types that include LINK to specify hyperlinking; DISPLAY used to specify the display of contours, cursor changes, etc; PLAY SOUND used to create sound effects in various contexts; TRACK used to specify the tracking of interactions and events associated with a user experience; and ADAPT DELIVERY used to specify the dynamic delivery of rich media content adapting to the available user bandwidth. Also contained in an action record is the specification of an action trigger. The triggers for actions can be user interaction, presentation state updates or player state updates. An example of would be the coming in to view of a certain segment of a presentation, the movement of mouse into a spatio-temporal range of a presentation, the click of the left mouse button within the present temporal range of the presentation, the completion of loading of a segment of the media data and so forth. Although the range record specifying a media segment associated with most action triggers are of type spatial, temporal or both there are some situations where the range type is inconsequential. A range type DONTCARE is designed for such situations. An example is where the action is determined entirely by the internal state of the media object producing the completion of a data loading trigger. The final piece of information contained in an action record is the data for action. The size of this data and its interpretation is different for each action type and subtype. The data information is where for example, the target URL string is found when the action type is LINK and the color information when the action type is DISPLAY.

The media frame 208 contains media bit stream data 209, initialization data 210, behavior data 215 and code 217. The behavior data or initialization data define the page and configuration of a corresponding media player respectively. Media bit stream data belonging to a particular media track and can be carried over multiple frames and these frames can be interlinked with meta frames and frames belonging to other media tracks. Media frames are identified by frame type and track identifier as carried in their header 213. The frame type and track identifier enable true multiplexed delivery and hence ideal for static or dynamic proportioning of various media tracks over limited bandwidth. Media frames can also often contain codes 217 that render the media type on the client station. The code in turn can be physically present or could be a URL reference. When present, the code is separated from the file on the server side 30 (see FIG. 1), and thereafter the code or data can be made available for on demand delivery. In the case of a URL reference to code, the code is fetched from a remote HTTP server to be similarly made available on demand.

The end-of-stream frame 212 is a marker that signals the end of the entire presentation associated with the HotMedia file 200. Frames belonging to multiple media tracks and meta data can be multiplexed in the HotMedia file. The end of stream frame is valuable to the client station in recognizing the end of each HotMedia file data stream which may otherwise be impossible when stream initialization data for each stream do not announce their respective lengths.

Further details on the HotMedia file format are described in IBM Research Report RC 21519[97069] entitled "The HotMedia Architecture: Progressive and Interactive Media for the Internet", dated July 1999, available from IBM Research, Yorktown, N.Y. 10598, and fully incorporated herein by reference.

After creation, the files 200 are transmitted by the delivery station 30 to the client station 50 through Java applets. Java applets are Java programs meant to be embedded in and controlled by a larger application, such as a web browser or an applet viewer. To include an applet as executable content, a special tag is required in the document. This tag points to an applet and provides configuration information about the applet. The Java applet is composed of classes. While a single applet may consist of only a single class, most large applets are broken into many classes. Each class is stored in a separate class file. Conveniently, Java facilitates the loading of class files in the processor. Further details on Java and loading class files are described in the text, "Exploring Java—2nd Edition" by P. Niemeyer et al., published by O'Reilly & Associates, 11011 Morris Street, Sebastopol, Calif. 95472 (1997).

Figure 3:
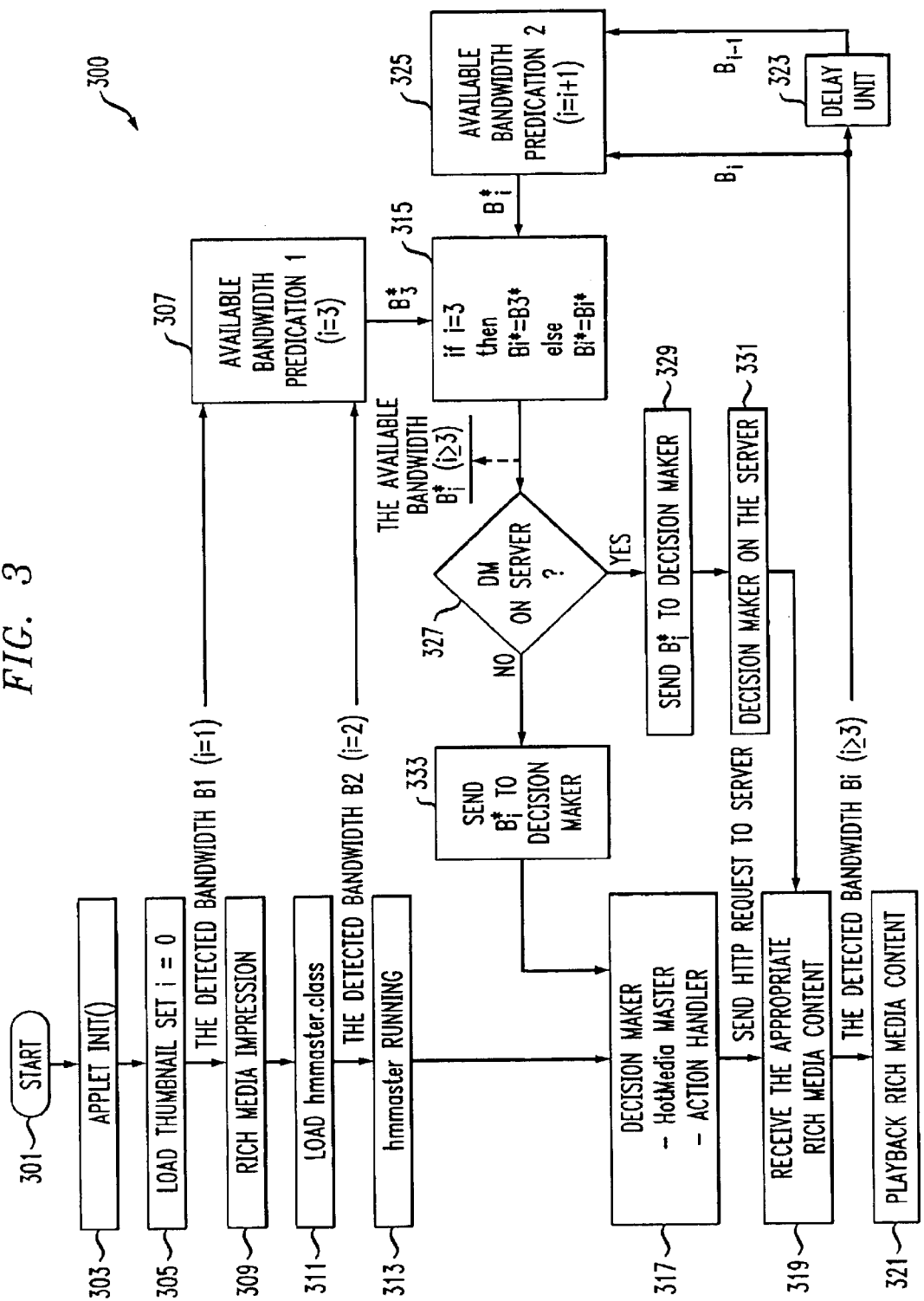
FIG. 3 is a flow diagram for real time measurement and prediction of bandwidth to the client station according to the available client bandwidth.

Turning to FIG. 3, a process 300 is shown for real time bandwidth measurement and prediction of the HotMedia file 200 according to a user's available bandwidth. Briefly, the basic idea is for the client station to (a) detect real time bandwidth used by the Java applet file, (b) predict the available bandwidth for the next media content delivery based on the detected bandwidth, then (c) fetch the corresponding bandwidth-sensitive track content from the content delivery station 30 or served by the content delivery station. The process results in an adaptive bandwidth-sensitive rich media content delivery system.

In FIG. 3, the delivery process 300 is initiated in step 301. In step 303, a HotMedia Java class (hm.class) is loaded first when an HTML page with the HotMedia applet is loaded. The Java applet initializes itself, reads the thumbnail frame 204, and starts a running thread in step 305. An index (i) is set to zero. A bandwidth (B1) for the applet can be calculated by dividing the thumbnail size in bits by the total time (T1) required by the thumbnail as provided by a client station clock. (B1=Thumbnail size/T1). The detected bandwidth B1 for (i=1) is provided to an index block 307 for subsequent calculation of the next available bandwidth for rich media content delivery.

In Step 309 a rich media file $200^1$ which may be in one or more files is accessed in the content delivery station. Much of the interesting phenomena occur only when the user becomes interested in probing beyond the thumbnail experience. The rich media impression means that the user triggers a rich media type that requires special code for its decoding and rendering, e.g. Panorama, animation and video. This impression can be achieved automatically or through user's mouse click.

In Step 311, the Java applet will load the master class (hmmaster.class). The load time T2 for the master class is provided by the client station clock. T2 is used to calculate a bandwidth B2 for the hmmaster.class where the size of the hmmaster.class is a known file size. B2 is calculated as B2=Size of hmmaster.class/T2 while setting i=2. The detected bandwidth B2 is provided to the index block 307 for prediction of the next available bandwidth.

In step 313, the hmmaster.class continues to run but is not used in predicting the next available bandwidth. Instead, B1 and B2 can be used by the client station to predict the next available bandwidth B3* for rich media content delivery to the client by the relationship B3*=f (B1, B2), where f is a mapping operator (*estimated). For instance, a linear prediction algorithm B3*=2*B2−B1 (Equation 1) can be used to predict the next available bandwidth for the file $200^1$. For input sequences B(i), B(i−1) . . . B(2), B(1), equation 1 can be re-written B*(i+1)=2*B(i)−B(i−1)(i=2, 3,) (Equation 2). Equation 2 can be re-written B*(i+1)=B(i)+[B(i) B−(i−1)]. (Equation 3). A more simpler algorithm is B*(i+1)=B(i). (Equation 4) which means the last monitored user bandwidth can be regarded as the next predicted available user bandwidth.

In step 315, the predicted algorithm for (i=3) is B(i)=B3* else Bi*=Bi* is provided to the index block 327 for deciding where the predicted available user bandwidth Bi* should be sent. There are two options for the decision maker to take advantage of this predicted available user bandwidth. The default setting is that the decision maker is located on the client station. This option can be changed by using the parameter "DM" in the HotMedia applet tag shown as follows:

<Param Name="DM" Value="Server">

That means the decision maker is located on the web server if the above applet tag exists. This flexibility allows the author to customize the decision maker on the web server. Obviously, it provides seamless interfacing with multiple adaptive content delivery servers requiring neither changes to server code nor changes to content.

So if the answer from index block 327 is "No", the predicted available user bandwidth Bi* will be sent to decision maker 317 on the client station through index block 333. Otherwise, the available user bandwidth Bi* will be sent to decision maker 331 through index block 329. Generally speaking in step 317 or 331, the predicted available user bandwidth is used by the decision maker to choose bandwidth-sensitive media content from the web server. The decision maker is software for performing the following functions:

Option 1: Decision maker is located on the client station

The client station make a decision to get the appropriate bandwidth sensitive content. For example, if the predicted bandwidth is around 56 kbps, then the http request to get the corresponding media content will be sent to the web server. If the bandwidth sensitive content is part of another HotMedia file on the web server, a CGI program or Servlet program 38 (See FIG. 1) will be called from the delivery station 30 to extract the requested content from a single HotMedia file 37.

If the bandwidth sensitive content is a separate Hot-Media file, the client station will automatically fetch this file or the server will redirect this HotMedia file to the client station if the client's request is not a file name.

Option 2. Decision maker is located on the web server:

The client sends the media content request along with the predicted available user bandwidth to the web server. In this case, the decision maker 331 should be located on the side of delivery station 30. The decision maker parses the http request and then decides which part of the HotMedia file or which HotMedia file will be sent to the client station 50. If necessary, a CGI or Servlet may be used to implement the decision maker on the web server.

As an example, the decision maker is located on the client station. Assuming there are three rich media files on the web server. The file names are listed as follows:

anim1.mvr
pan1.mvr
pan2.mvr

The first one "anim1.mvr" has a hotlink to a Panorama with adaptive delivery option. The adaptive delivery token name is set to "AD1" shown in the following applet tag in the published html file:

<applet code="hm25.class" width="200" height="200" MAYSCRIPT>
<param name="mvrfile" value="anim1.mvr">
<param name="AD1" value="bandwidth1=28&content1=pan1.mvr&bandwidth2=56&content2=pan2.mvr">
</applet>

The second one "pan1.mver" just includes panorama with low quality picture designed for 28.8 k modem connection. The third one "pan2.mvr" includes the same panorama content but with high quality picture designed for 56 k modem connection.

When the above html page is loaded into web browser 57 and the applet starts running, the animation will be displayed. When the user clicks a hotspot with the adaptive delivery link, the client station 50 will take care of this action by doing the following tasks:

1. Parse the information from the applet tag, then generate the following rules for the decision maker:
   A. if the predicted available user bandwidth is about 28 kbps, then the hotlinked media content should choose the corresponding file "pan1.mvr"
   B. else if the predicted available user bandwidth is about 56 kbps, then the hotlinked media content should choose the corresponding file "pan2.mvr"

2. The decision maker uses the predicted available user bandwidth and the above rule to make a decision on what's the next media content and sends an http request to fetch the appropriate media content in step 319. In a real implementation, a threshold can be set to decide if the predicted bandwidth is located in the range of the rule or not. The general rule is as follows:

"if abs(the predicted available user bandwidth−the optional bandwidth information from applet tag) <Threshold then pick up the corresponding media content."

Where the abs represents the mathematical operator to get an absolute value. For example, 5 kbps may be chosen as a reasonable size to match the rule. At this time, if the current predicted available user bandwidth is 25 kbps, then the decision maker will do the following checking:

if abs (25−28)<5 then fetch pan1.mvr
else if abs (25−56)<5 then fetch pan2.mvr

Obviously, in the current case, the pan1.mvr will be chosen for the next media content. That means, the final decision from the decision maker 317 is to ask the HotMedia Master to fetch rich media file "pan1.mvr" rather than "pan2.mvr" from the content delivery station 30.

In step 321, playback of the rich media file 2001 occurs while the detected bandwidth Bi for (i>=3) is provided to a delay unit 323 as Bi and to an available bandwidth prediction process 325 as B(i−1). A predicted bandwidth Bi* for (i=i+1) is provided to the index block 315 which produces result Bi*=B3* if (i=3) else Bi*=Bi* and the output is provided to the decision maker in step 317.

As an example of the process of FIG. 3, assume there are four bandwidth-sensitive video contents encoded at 20 kbps, 50 kbps, 80 kbps, and 140 kbps, respectively. These video clips may be contained in one-single HotMedia file or multiple HotMedia files. The predicted available bandwidth Bi* can be used to make a decision which content should reach the client. In this example, we assume the default setting for the decision maker is used. That is, the decision maker is located on the client station. A demonstration of this decision is as follows:

1. While the media track content is downloaded, the lapsed time T3 is recorded. The media content size can be found from the Java applet. The detected bandwidth is calculated after the media content is loaded completely. That is, B3=Size (Media Track Content)/T3.

2. In general, the following formula can be used to predict the next available bandwidth:

$$B*(i+1)=f(B_i, B_{i-1})(i>=2)$$

The decision maker on the client station chooses an appropriate media content according to the predicted available bandwidth B*(i+1). Meanwhile, the decision maker submits an http request to the content delivery station. The current used bandwidth to download the media track is calculated as follows:

$B(i+1)$=Size of Media track content (i+1)/T(i+1) where T(i+1) is the total time to download the media track content.

3. The following rules will be used in the decision maker. If B3* less than 28 kbps, then the client receives 20 kbps video content. Or else, if B3* less than 56 kbps, then the client receives 50 kbps video content. Else if B3* less than 128 kbps, then the client receives 80 kbps video content. Else, the client receives 140 kbps video content.

4. Steps 2–3 are repeated until the Java applet is destroyed.

In the viewing phase, the applet will send content requests from the decision maker to the content delivery station or web server. So from the end user point of view, the user will see the bandwidth sensitive rich media presentation when surfing Internet in different network connections.

While the invention has been shown and described in a preferred embodiment, various changes can be made in the spirit and scope of the invention therein without departing from the spirit and scope of the invention as defined in the appended claims, in which:

We claim:

1. A network using a rich media authoring tool architecture and including a content delivery station and a client station for adaptive delivery of rich media content to the client station for user interaction based on real time bandwidth measurement and prediction according to available user bandwidth, comprising:

(a) means for creating rich media content in a streaming file having a framework including at least a thumbnail frame and a media frame;

(b) means for transmitting the streaming files through object oriented programming language applets;

(c) means for calculating a first detected bandwidth measurement B1 based on a thumbnail frame size in bits divided by a time T1 or a thumbnail frame loading time;

(d) means for calculating a second detect bandwidth measurement B2 based on an object oriented programming language class size divided by a time T2 or an object oriented programming language class loading time;

(e) means for predicting a bandwidth B3 for a next available rich media content delivery based a media frame size dived by a time T3 or a media frame loading time;

(f) means for predicting succeeding next available bandwidth base on a discrete time series where Bi (i=1, 2, . . . ) and B*(i+1)=f(Bi, Bi−1(i>=3) where f is a mapping operator; and (g) decision maker means for choosing an appropriate media content for delivery to the client station according to a predicted available bandwidth B*(i+1).

2. The network as described in claim 1 wherein the mapping operator f can be any appropriate linear or no-linear mapping including artificial neural network and fuzzy logic reasoning.

3. The network as described in claim 1 wherein the decision maker can be on either the client station or the content delivery station.

4. The network as described in claim 3 wherein the decision maker on the client station further comprises:

(a) means for making a decision based on the predicted available user bandwidth in the client station;

(b) means for sending decision information from the client station to the content delivery station through an http request;

(c) means for fetching the appropriate media content directly based on the predicted available user bandwidth; and (d) means for receiving the appropriate media content as a response of the http request made by the client station.

5. The network as described in claim 3 wherein the decision maker on the content delivery station further comprises:

(a) means for sending the predicted available user bandwidth from the client station to the content delivery station through an http request;

(b) means for making a decision based on a received predicted available user bandwidth; and (c) means for delivering the appropriate media content to the client station.

6. The network as described in claim 1 wherein the steaming file comprises multiple media frames without a thumbnail frame.

7. The network as described in claim 1 wherein the appropriate media content comprises any web elements.

8. The network as described in claim 1 wherein the appropriate media content comprises any media frame in the same streaming file.

9. The network as described in claim 1 wherein the appropriate media content comprises any media frame in another streaming file.

10. The network as described in claim 1 wherein the real time bandwidth measurement comprises a key event bandwidth measurement that is more efficient and effective than all time bandwidth monitoring.

11. In a network using a rich media authoring tool architecture and including a content delivery station and a client station for adaptive delivery of rich media content to the client station for user interaction based on real time bandwidth measurement and prediction according to available user bandwidth, comprising the steps of:

(a) creating rich media content in a streaming file having a framework including at least a thumbnail frame and a media frame;

(b) transmitting the streaming files through object oriented programming language applets;

(c) calculating a first detected bandwidth measurement B1 based on a thumbnail frame size in bits divided by a time T1 or a thumbnail frame loading time;

(d) calculating a second detect bandwidth measurement B2 based on an object oriented programming language class size divided by a time T2 or an object oriented programming language class loading time;

(e) predicting a bandwidth B3 for a next available rich media content delivery based a media frame size dived by a time T3 or a media frame loading time;

(f) predicting succeeding next available bandwidth base on a discrete time series where Bi(i=1, 2, . . . ) and B*(i+1)=f(Bi, Bi−1 (i>=3) where f is a mapping operator; and (g) a decision maker choosing an appropriate media content for delivery to the client station according to a predicted available bandwidth B*(i+1).

12. The method of claim 11 wherein the decision maker on the client station further comprising the steps of:

(a) making a decision based on the predicted available user bandwidth in the client station;

(b) sending decision information from the client station to the content delivery station through an http request;

(c) fetching the appropriate media content directly based on the predicted available user bandwidth; and (d) receiving the appropriate media content as a response of the http request made by the client station.

13. The method of claim 11 wherein the decision maker on the content delivery station further comprising the steps of:

(a) sending the predicted available user bandwidth from the client station to the content delivery station through an http request;

(b) making a decision based on a received predicted available user bandwidth; and (c) means for delivering the appropriate media content to the client station.

14. The method of claim 11 wherein the mapping operator f can be any appropriate linear or no-linear mapping including artificial neural network and fuzzy logic reasoning.

15. The method of claim 11 wherein the appropriate media content comprises any media frame in the same streaming file.

16. The method of claim 11 wherein the appropriated media content comprises any media frame in another streaming file.

17. The method of claim 11 wherein the real time bandwidth measurement comprises a key event bandwidth measurement that is more efficient and effective than all time bandwidth monitoring.

* * * * *

UNITED STATES PATENT AND TRADEMARK OFFICE
CERTIFICATE OF CORRECTION

PATENT NO. : 6,848,004 B1
DATED : January 25, 2005
INVENTOR(S) : S-P.S. Chang et al.

It is certified that error appears in the above-identified patent and that said Letters Patent is hereby corrected as shown below:

Title page,
Item [75], Inventors, delete "Shu-Chen" and insert -- Shu-Chun --.
Item [57], ABSTRACT,
Line 11, delete "fame" and insert -- frame --.

Column 10,
Line 8, delete "2001" and insert -- $200^1$ --.

Signed and Sealed this

Twenty-second Day of March, 2005

JON W. DUDAS
*Director of the United States Patent and Trademark Office*